United States Patent
Priyadarshana et al.

(10) Patent No.: US 10,012,521 B2
(45) Date of Patent: *Jul. 3, 2018

(54) ULTRASONIC FLOW METERING WITH LAMINAR TO TURBULENT TRANSITION FLOW CONTROL

(71) Applicant: Daniel Measurement and Control, Inc., Houston, TX (US)

(72) Inventors: Paththage Jayampathi Anuradha Priyadarshana, Cypress, TX (US); Drew Shine Weaver, Houston, TX (US); Peter Syrnyk, Houston, TX (US); Dale Goodson, Katy, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 385 days.

This patent is subject to a terminal disclaimer.

(21) Appl. No.: 14/716,311

(22) Filed: May 19, 2015

(65) Prior Publication Data

US 2015/0260558 A1 Sep. 17, 2015

Related U.S. Application Data

(63) Continuation of application No. 13/778,872, filed on Feb. 27, 2013, now Pat. No. 9,068,870.

(51) Int. Cl.
*G01F 1/66* (2006.01)
*G01F 15/00* (2006.01)
*F15D 1/02* (2006.01)

(52) U.S. Cl.
CPC .............. *G01F 1/66* (2013.01); *F15D 1/025* (2013.01); *G01F 1/662* (2013.01); *G01F 1/667* (2013.01); *G01F 1/668* (2013.01); *G01F 15/00* (2013.01)

(58) Field of Classification Search
CPC combination set(s) only.
See application file for complete search history.

(56) References Cited

U.S. PATENT DOCUMENTS

| 4,365,518 A | 12/1982 | Zacharias |
|---|---|---|
| 5,987,997 A | 11/1999 | Roskam et al. |

(Continued)

FOREIGN PATENT DOCUMENTS

| CN | 101617201 A | 12/2009 |
|---|---|---|
| JP | 2003-302266 A | 10/2003 |

(Continued)

OTHER PUBLICATIONS

EP Patent Application No. 14757742.3 Extended EP Search Report dated Nov. 10, 2016 (8 pages).

(Continued)

*Primary Examiner* — Mamadou Diallo
(74) *Attorney, Agent, or Firm* — Conley Rose, P.C.

(57) ABSTRACT

Apparatus and method for ultrasonic flow metering of viscous fluids. In one embodiment, an ultrasonic flow metering system includes an ultrasonic flow meter, a flow conditioner, and a reducer. The ultrasonic flow meter includes a pair of ultrasonic transducers arranged to exchange ultrasonic signals through a fluid stream flowing between the transducers. The flow conditioner is disposed upstream of the ultrasonic flow meter. The reducer is disposed between the flow conditioner and the ultrasonic flow meter to reduce the cross sectional area of the fluid stream flowing from the flow conditioner to the ultrasonic flow meter.

23 Claims, 9 Drawing Sheets

(56) References Cited

U.S. PATENT DOCUMENTS

| | | | |
|---|---|---|---|
| 6,053,054 | A | 4/2000 | Wusterbarth et al. |
| 6,494,105 | B1 | 12/2002 | Gallagher |
| 6,644,132 | B1 | 11/2003 | Baumoel |
| 6,647,806 | B1 | 11/2003 | Estrada et al. |
| 6,651,514 | B2 | 11/2003 | Zanker |
| 6,851,322 | B2 | 2/2005 | Gallagher |
| 7,810,401 | B2 | 10/2010 | Brown et al. |
| 9,068,870 | B2 | 6/2015 | Priyadarshana et al. |
| 2007/0136008 | A1 | 6/2007 | Liu et al. |
| 2010/0229654 | A1 | 9/2010 | Ao et al. |
| 2011/0005335 | A1 | 1/2011 | Brown et al. |
| 2011/0023621 | A1* | 2/2011 | Augenstein ............ G01F 1/662 73/861.18 |
| 2014/0013857 | A1 | 1/2014 | Lupeau et al. |
| 2014/0109690 | A1* | 4/2014 | Ramsay .................. G01F 1/66 73/861.28 |

FOREIGN PATENT DOCUMENTS

| | | |
|---|---|---|
| JP | 2003-307445 A | 10/2003 |
| JP | 2009-264906 A | 11/2009 |
| WO | 2010-002432 A1 | 1/2010 |

OTHER PUBLICATIONS

Chinese Patent Application No. 201410069801.3 First Office Action dated Aug. 26, 2016 (20 pages).

International Patent Application No. PCT/US2014/018264 International Search Report and Written Opinion dated Jun. 25, 2014 (18 pages).

Canadian Patent Application No. 2,902,166 Office Action dated Jun. 9, 2016 (18 pages).

Russian Patent Application No. 2015135634 Official Action dated Jun. 9, 2016 (15 pages).

Mexican Office Action; Application No. MX/a/2015/011039; dated May 17, 2017; 4 pages.

Mexican Office Action; Application No. MX/a/2015/011039; dated Oct. 24, 2017; 4 pages.

* cited by examiner

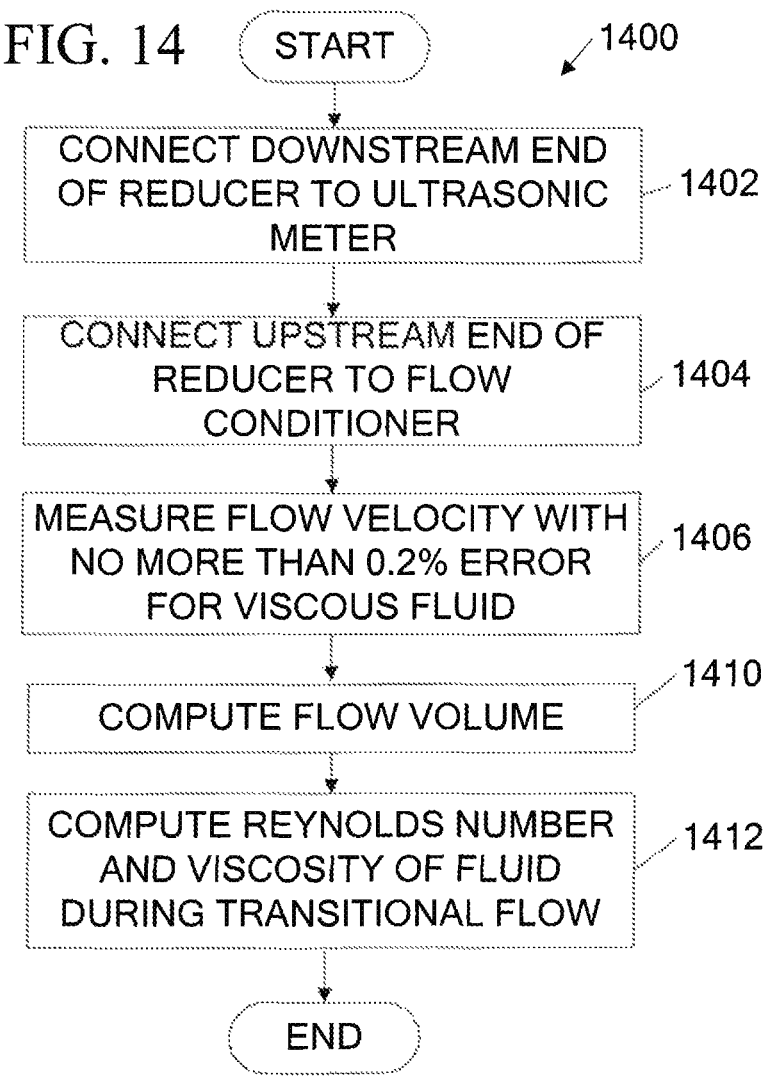

ly flowing through the ultrasonic flow meter such that the ultrasonic flow meter measures velocity of the fluid stream with less than 0.2 percent error while the fluid stream has a Reynolds number less than 5000.

ULTRASONIC FLOW METERING WITH LAMINAR TO TURBULENT TRANSITION FLOW CONTROL

CROSS REFERENCE TO RELATED APPLICATIONS

This application is a continuation under 35 U.S.C. § 120 of U.S. patent application Ser. No. 13/778,872, filed Feb. 27, 2013, entitled "Ultrasonic Flow Metering With Laminar To Turbulent Transition Flow Control," the disclosure of which is hereby incorporated herein by reference in its entirety.

BACKGROUND

Hydrocarbon fluids are transported from place-to-place via pipelines. It is desirable to know with accuracy the amount of fluid flowing in the pipeline, and particular accuracy is demanded when the fluid is changing hands, or "custody transfer." Even where custody transfer is not taking place, however, measurement accuracy is desirable, and in these situations, flow meters may be used.

Ultrasonic flow meters are one type of flow meter that may be used to measure the amount of fluid flowing in a pipeline. Ultrasonic flow meters have sufficient accuracy to be used in custody transfer. In an ultrasonic flow meter, acoustic signals are sent back and forth across the fluid stream to be measured. Based on parameters of received acoustic signals, the fluid flow velocity in the flow meter is computed. The volume of fluid flowing through the meter can be determined from computed flow velocities and the known cross-sectional area of the flow meter.

Accurate measurement of flow velocity at an ultrasonic flow meter requires a well developed flow profile. Conventional ultrasonic flow metering systems provide such a flow profile by positioning either a long stretch of straight pipe or a flow conditioning device upstream of the ultrasonic flow meter.

SUMMARY

Systems and methods for ultrasonic flow metering of viscous fluids are disclosed herein. In one embodiment, an ultrasonic flow metering system includes an ultrasonic flow meter, a flow conditioner, and a reducer. A pipe reducer is an apparatus that transitions a pipe from a larger bore diameter upstream to a smaller bore diameter downstream. The ultrasonic flow meter includes a pair of ultrasonic transducers arranged to exchange ultrasonic signals through a fluid stream flowing between the transducers. The flow conditioner is disposed upstream of the ultrasonic flow meter. The reducer is disposed between the flow conditioner and the ultrasonic flow meter to reduce the cross-sectional area of the fluid stream flowing from the flow conditioner to the ultrasonic flow meter.

In another embodiment, a method includes connecting a downstream end of a reducer to an upstream end of an ultrasonic flow meter, and connecting an upstream end of the reducer to a downstream end of a flow conditioner. The inner cross-sectional area of the downstream end of the reducer is smaller than the inner cross-sectional area of the upstream end of the reducer.

In a further embodiment, an ultrasonic flow metering system includes a flow conditioner, a reducer, and an ultrasonic flow meter. The flow conditioner is coupled to an upstream end of the reducer, and the ultrasonic flow meter is coupled to a downstream end of the reducer. The flow conditioner and the reducer condition a fluid stream flowing through the ultrasonic flow meter such that the ultrasonic flow meter measures velocity of the fluid stream with less than 0.2 percent error while the fluid stream has a Reynolds number less than 5000.

BRIEF DESCRIPTION OF THE DRAWINGS

For a detailed description of exemplary embodiments of the invention, reference will now be made to the accompanying drawings in which:

FIG. 14 shows a flow diagram for a method for measuring viscous liquids using an ultrasonic flow meter in accordance with principles disclosed herein.

NOTATION AND NOMENCLATURE

Figure 1:
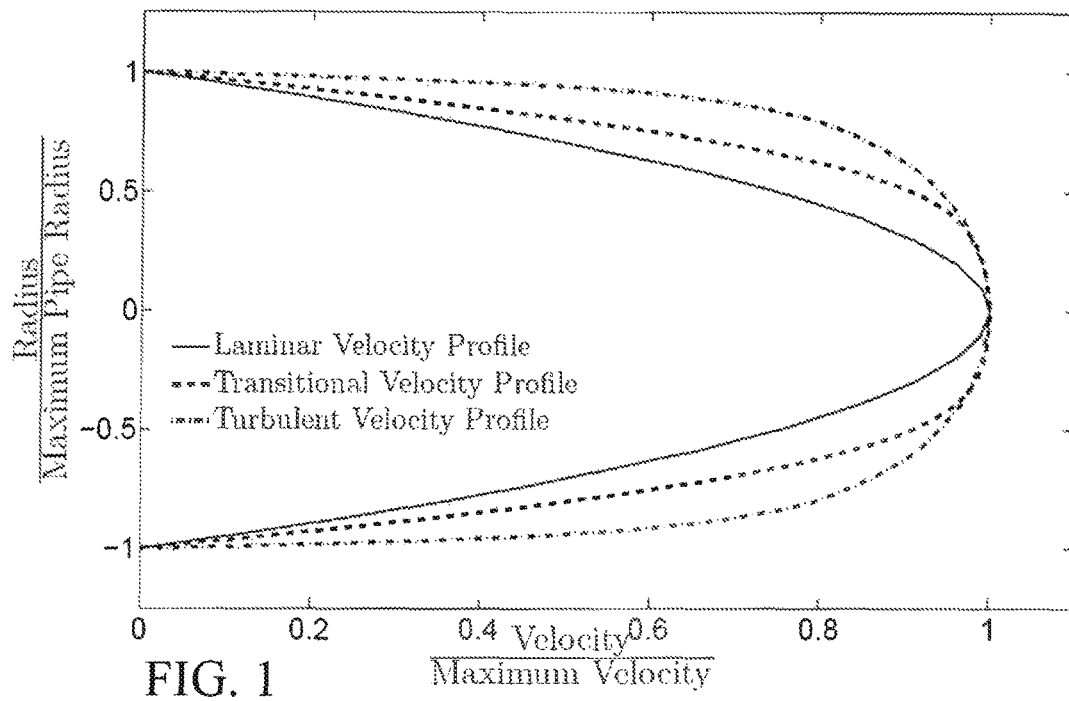
FIG. 1 shows a plot of flow profiles illustrative of laminar, transitional, and turbulent fluid flows.

In the following discussion and in the claims, the terms "including" and "comprising" are used in an open-ended fashion, and thus should be interpreted to mean "including, but not limited to . . . ." In addition, the term "couple" or "couples" is intended to mean either an indirect or a direct connection. Thus, if a first device couples to a second device, that connection may be through a direct connection, or through an indirect connection accomplished via other devices and connections. The recitation "based on" is intended to mean "based at least in part on." Therefore, if X is based on Y, X may be based on Y and any number of other factors. The term "fluid" includes liquids and gases.

DETAILED DESCRIPTION

The following description is directed to various exemplary embodiments of the invention. The drawing figures are not necessarily to scale. Certain features of the embodiments may be shown exaggerated in scale or in somewhat schematic form and some details of conventional elements may not be shown in the interest of clarity and conciseness. The disclosed embodiments should not be interpreted, or otherwise used, to limit the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. It is to be fully recognized that the different teachings of the embodiments discussed below may be employed separately or in any suitable combination to produce desired results. Further, the various embodiments were developed in the context of measuring hydrocarbon flows (e.g., crude oil or refined products), and the description follows from the developmental context; however, the systems and methods described are equally applicable to measurement of any fluid flow.

A conventional ultrasonic liquid flow metering system may include a pipe diameter reducer upstream of a flow conditioner that is upstream of a length (e.g., eight pipe diameters) of straight pipe that provides fluid flow to the flow meter. Such a conventional system is sufficient for providing flow rate measurement with ultrasonic flow meters for liquids in the turbulent flow regime. However, such systems are inadequate for measuring flow of non-turbulent flow regimes that are associated with high viscosity fluids. Such systems, which utilize in-line flow conditioning devices, also introduce a pressure drop which increases significantly with viscosity of working fluids.

A flow is termed "turbulent" for liquids with low viscosities flowing at moderate speeds through a pipeline. Turbulent flow has a unique well defined velocity profile. Similarly, a flow is termed "laminar" for liquids with very high viscosity flowing at low speeds. Laminar flow has a different velocity profile from turbulent flow. When the flow velocity is increased from zero in a high viscous fluid, depending upon system parameters, the flow regime changes from laminar to turbulent. The change from laminar to turbulent flow is not abrupt and occurs over a wide range of flow velocity. The status of the flow during this regime change is known as "transitional" flow. Velocity profiles in the transitional region are typically not well defined and may be unstable.

FIG. 1 shows illustrative transitional, laminar, and transitional velocity profiles in a pipe having circular cross section. Velocity profiles in pipes having non-circular cross sections are similar to those shown. The different flow regimes can be distinguished by a dimensionless parameter called Reynolds number (Re) defined as:

$$Re = \frac{Ud}{v} \quad (1)$$

where:
U is the mean velocity across the pipe cross section;
d is the internal pipe diameter; and
v is the kinematic viscosity of the fluid.

Figure 2:
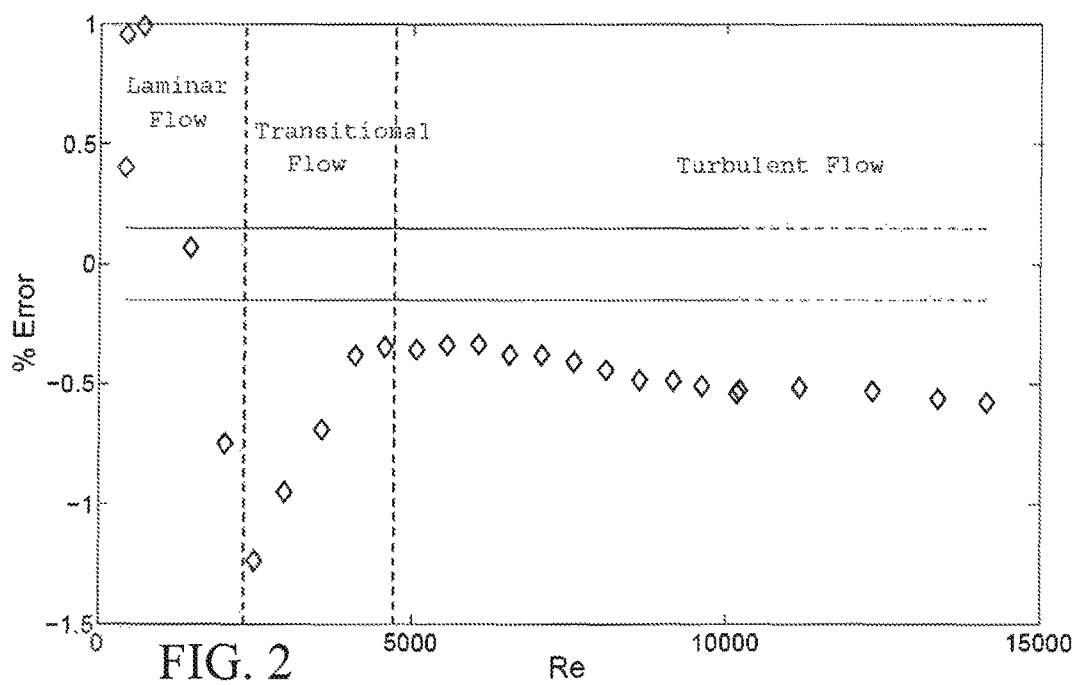
FIG. 2 shows a plot of exemplary percent error characteristic of laminar, transitional, and turbulent fluid flows.

The flow is laminar when Reynolds number is below about 2300, turbulent when Re is above about 5000, and transitional when Reynolds number is between 2300 and 5000. Within the transitional zone, the flow characteristics change rapidly between laminar and turbulent flows. Consequently, the velocity profile of the flow fluctuates rapidly between laminar and turbulent velocity profiles in what is known as intermittent behavior. The time averaged transitional velocity profile may assume a shape dependent on the intermittency at a particular Reynolds number. The intermittent nature of the transitional mean velocity profile makes it difficult to obtain a stable flow measurement using a conventionally arranged liquid ultrasonic flow metering system. Under these conditions the flow rate measurement error curve is highly non-linear. FIG. 2 shows a plot of exemplary percent error characteristic of laminar, transitional, and turbulent fluid flows. The error is uniform and linear within the preliminary turbulent region and is non-uniform and non-linear within laminar and transitional regions. Therefore, as the Reynolds number decreases the percentage error in measured volumetric flow rates with conventional liquid ultrasonic flow metering systems increases beyond the allowable limit for custody transfer applications.

Figure 3:
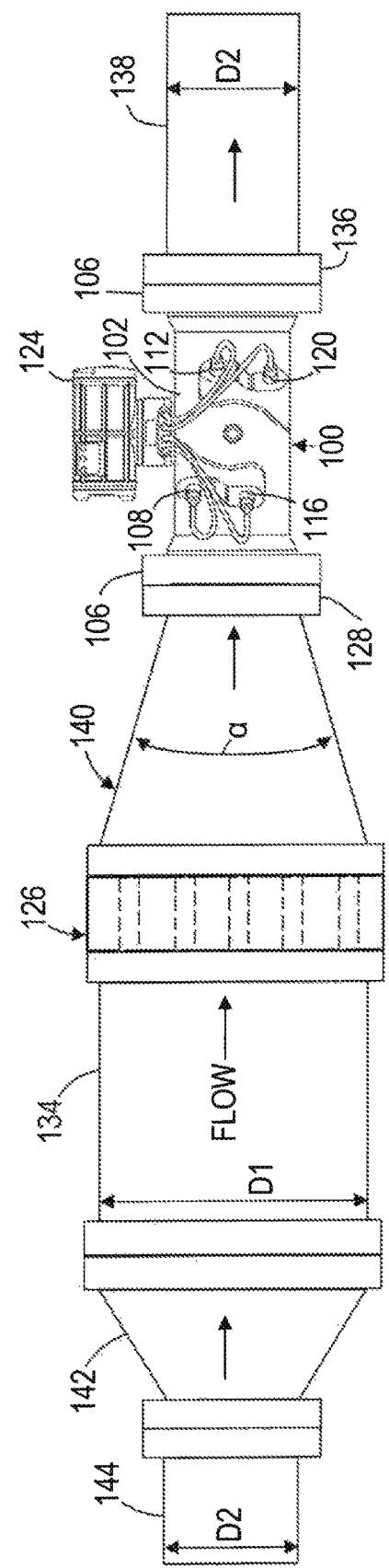
FIG. 3 shows an ultrasonic metering system for metering of viscous fluids that provides control of laminar to turbulent flow transition in accordance with principles disclosed herein.

Embodiments of the present disclosure include a liquid ultrasonic flow metering system that extends the linearity of liquid ultrasonic flow measurement to fluids having Reynolds numbers less than 1000. In contrast, with conventional ultrasonic systems linearity is limited to fluids having Reynolds number above about 5000. Thus, embodiments may be applied to ultrasonic metering of viscous fluids such as heavy crude oil or viscous refined products having relatively low Reynolds numbers FIG. 3 shows an ultrasonic flow metering system 30 for metering of viscous fluids in accordance with principles disclosed herein. The system 30 provides improved measurement of viscous fluid flow by controlling laminar to turbulent flow transition. The system 30 includes an ultrasonic flow meter 100, a reducer 140, and a flow conditioner 126. The flow conditioner 126 is positioned upstream of the reducer 140, and the reducer 140 is positioned upstream of the ultrasonic flow meter 100. The system 30 is coupled to fluid flow via a straight pipe section 134 that may be at least three pipe diameters (diameter of pipe section 134) in length (e.g., 3 to 5 pipe diameters), upstream of the flow conditioner 126. The pipe section 134 may include a fully open isolation valve. Some embodiments of the system 30 may further include an expander 142 upstream of pipe section 134. The expander 142 adapts the pipe section 134 to a smaller diameter pipe section 144 upstream of the expander 142. For example, where the pipe section 134 has bore diameter D1, the expander 142 couples the pipe section 134 to pipe section 144 which has bore diameter D2, where D2<D1. In some embodiments, pipes 144 and 138 may have the same bore diameter (e.g., D2).

The ultrasonic flow meter 100 includes a meter body or spool piece 102 that defines a central passage or bore. The upstream end of the spool piece 102 is coupled to the reducer 140 such that the fluids flowing in the pipe 134 travel through the central bore. While the fluids travel through the central bore, the ultrasonic flow meter 100 measures the flow rate (hence, the fluid may be referred to as the measured fluid). The spool piece 102 includes flanges 106 that facilitate coupling of the spool piece 102 to the reducer 140, the pipe 138, or other structures. Any suitable system for coupling the spool piece 102 to a structure may be used (e.g., bolts, clamps, weld connections, etc.).

In order to measure fluid flow within the spool piece 102, the ultrasonic flow meter 100 includes a plurality of transducer assemblies. In the view of FIG. 3, four such transducers assemblies 108, 112, 116 and 120 are shown. The transducer assemblies are paired (e.g., transducer assembly 108 is paired with a transducer on the opposite side of the spool piece which is not shown in FIG. 3), as will be further discussed below. Moreover, each transducer assembly electrically couples to control electronics 124. More particularly, each transducer assembly is electrically coupled to the control electronics 124 by way of a respective cable or equivalent signal conducting assembly.

Figure 4:
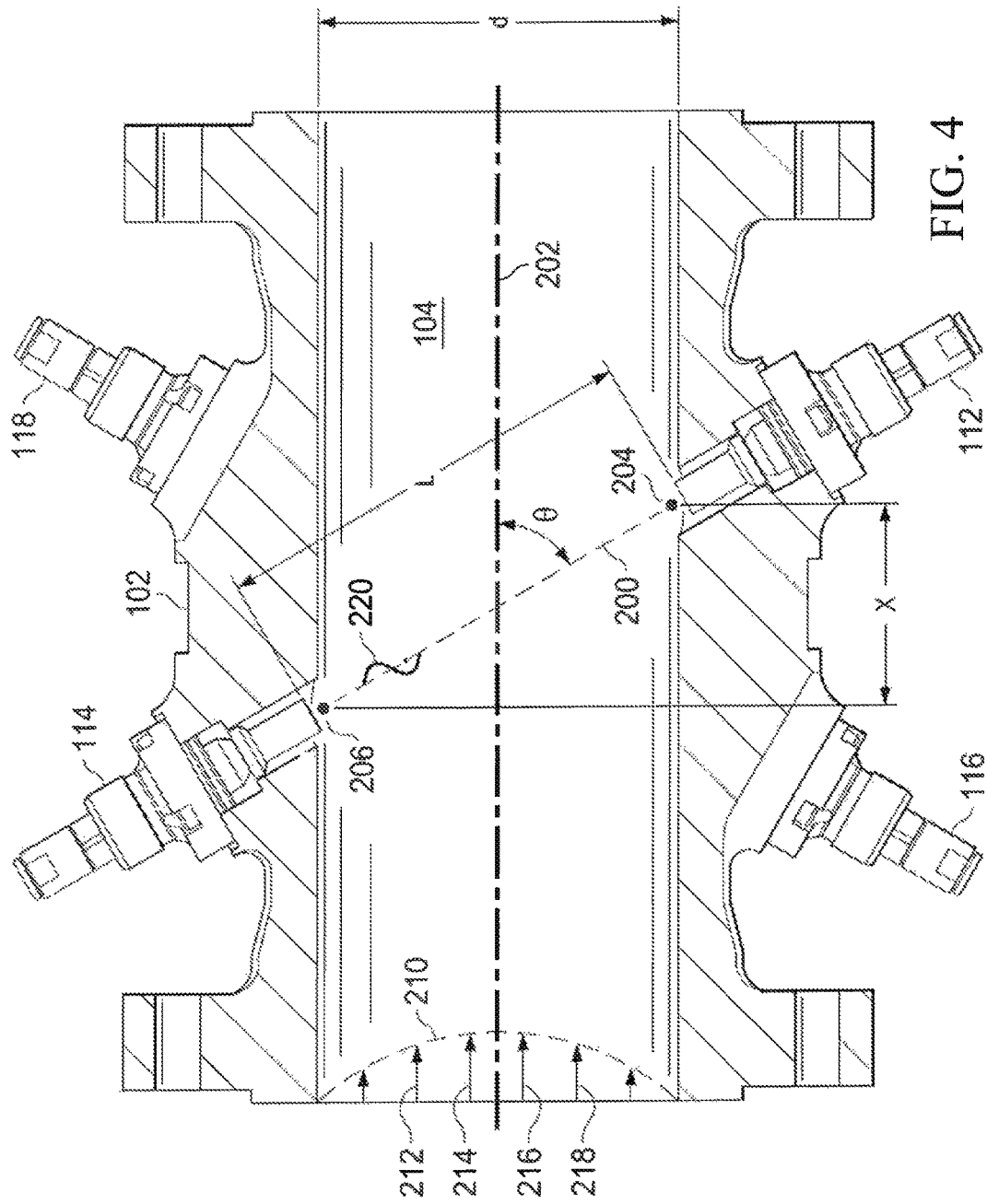
FIG. 4 shows a cross-sectional overhead view of an ultrasonic flow meter in accordance with principles disclosed herein.

FIG. 4 shows a cross-sectional overhead view of the ultrasonic flow meter 100. Spool piece 102 has a predetermined size and defines the central bore 104 through which the measured fluid flows. An illustrative pair of transducers assemblies 112 and 114 is located along the length of spool piece 102. Transducers 112 and 114 are acoustic transceivers, and more particularly ultrasonic transceivers. The ultrasonic transducers 112, 114 both generate and receive acoustic signals having frequencies above about 20 kilohertz. The acoustic signals may be generated and received by a piezoelectric element in each transducer. To generate an ultrasonic signal, the piezoelectric element is stimulated electrically by way of a signal (e.g., a sinusoidal signal), and the element responds by vibrating. The vibration of the piezoelectric element generates the acoustic signal that travels through the measured fluid to the corresponding transducer assembly of the pair. Similarly, upon being struck by an acoustic signal, the receiving piezoelectric element vibrates and generates an electrical signal (e.g., a sinusoidal signal) that is detected, digitized, and analyzed by the control electronics 124 associated with the flow meter 101.

A path 200, also referred to as a "chord," exists between illustrative transducer assemblies 112 and 114 at an angle θ to a centerline 202. The length of chord 200 is the distance between the face of transducer assembly 112 and the face of transducer assembly 114. Points 204 and 206 define the locations where acoustic signals generated by transducer assemblies 112 and 114 enter and leave fluid flowing through the spool piece 102 (i.e., the entrance to the spool piece bore). The position of transducer assemblies 112 and 114 may be defined by the angle θ, by a first length L measured between the faces of the transducer assemblies 112 and 114, a second length X corresponding to the axial distance between points 204 and 206, and a third length d corresponding to the spool piece inside diameter. In most cases, distances d, X, and L are precisely determined during flow meter fabrication. A measured fluid, such as crude oil (or a refined product), flows in a direction 208 with a velocity profile 210. Velocity vectors 212, 214, 216 and 218 illustrate that the fluid velocity through spool piece 102 increases toward the centerline 202 of the spool piece 102.

Initially, downstream transducer assembly 112 generates an ultrasonic signal that is incident upon, and thus detected by, upstream transducer assembly 114. Sometime later, the upstream transducer assembly 114 generates a return ultrasonic signal that is subsequently incident upon, and detected by, the downstream transducer assembly 112. Thus, the transducer assemblies exchange or play "pitch and catch" with ultrasonic signals 220 along chordal path 200. During operation, this sequence may occur thousands of times per minute.

The transit time of an ultrasonic signal 220 between illustrative transducer assemblies 112 and 114 depends in part upon whether the ultrasonic signal 220 is traveling upstream or downstream with respect to the fluid flow. The transit time for an ultrasonic signal traveling downstream (i.e., in the same direction as the fluid flow) is less than its transit time when traveling upstream (i.e., against the fluid flow). The upstream and downstream transit times can be used to calculate the average velocity along the signal path, and the speed of sound in the measured fluid. Given the cross-sectional measurements of the flow meter 100 carrying the fluid, the average velocity over the area of the central bore 104 may be used to find the volume of fluid flowing through the spool piece 102.

Figure 5:
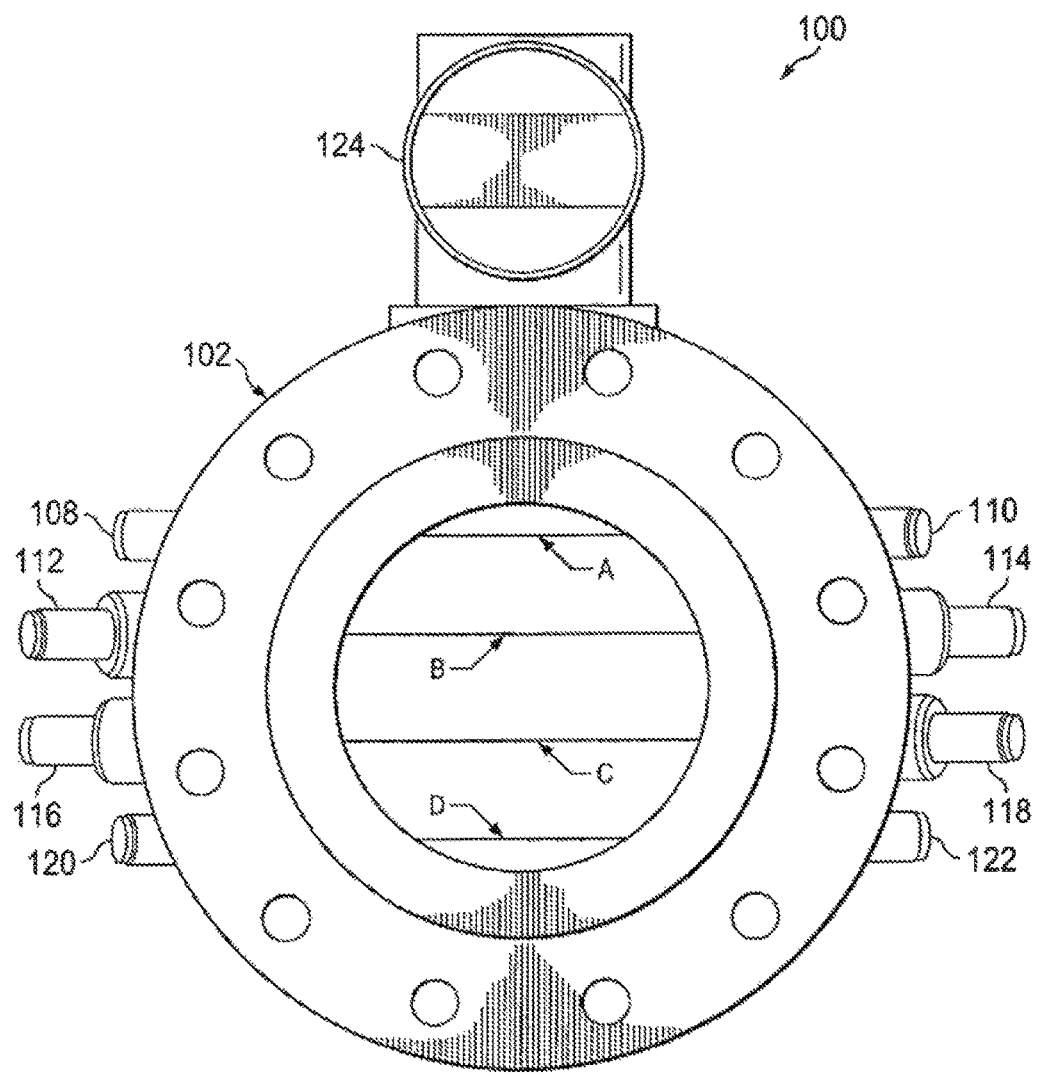
FIG. 5 shows an end elevation view of a four path ultrasonic flow meter in accordance with principles disclosed herein.

Ultrasonic flow meters can have one or more chords. For example, FIG. 5 shows an end elevation view of the ultrasonic flow meter 100 showing four chordal paths at varying elevations within the spool piece 102. Chordal path A is formed between transducers 108 and 110. Chordal path B is formed between transducers 112 and 114. Chordal path C is formed between transducers 116 and 118. Chordal path D is formed between transducers 120 and 122. The flow velocity of the fluid may be determined at each chord to obtain chordal flow velocities, and the chordal flow velocities combined to determine an average flow velocity over the entire pipe. From the average flow velocity, the amount of fluid flowing in the spool piece, and thus the pipeline, may be determined.

Typically, the control electronics 124 causes the transducers (e.g., 112, 114) to fire and receives output signals from the transducers. The control electronics 124 may also compute the mean flow velocity for each chord, compute the mean flow velocity for the meter, compute the volumetric flow rate through the meter, compute speed of sound through the fluid, perform meter diagnostics, etc.

For a given chord, the chordal flow velocity v is given by:

$$v = \frac{L^2}{2X} \cdot \frac{T_{up} - T_{dn}}{T_{up} T_{dn}}, \quad (2)$$

and the chordal speed of sound c is given by:

$$c = \frac{L}{2} \cdot \frac{T_{up} + T_{dn}}{T_{up} T_{dn}} \quad (3)$$

where:
L is the path length (i.e., face-to-face separation between upstream and downstream transducers),
X is the component of L within the meter bore in the direction of the flow, and
$T_{up}$ and $T_{dn}$ are the upstream and downstream transit times of sound energy through the fluid.

The average flow velocity through the meter 101 is given by:

$$v_{avg} = \sum_{i=A}^{D} w_i v_i \quad (4)$$

where:
$w_i$ is a chordal weighting factor,
$v_i$ is the measured chordal flow velocity, and the summation i is over all chords.

Based on the measured velocities for each chord, the control electronics 124 may compute a profile factor value as a ratio of inner chordal velocities to outer chordal velocities. For the four chords of the ultrasonic flow meter 100, the control electronics 124 may compute profile factor (PF) as:

$$PF = \frac{V_B + V_C}{V_A + V_D} \quad (5)$$

where,
$V_A$ is the velocity of chord A,
$V_B$ is the velocity of chord B,
$V_C$ is the velocity of chord C, and
and,
$V_D$ is the velocity of chord D.

Returning now to FIG. 3, the flow conditioner 126 reduces swirl and large scale turbulence, and improves the mean velocity profile of the fluid stream provided to the ultrasonic meter 100. The flow conditioner 126 may be, for example, a tube bundle or a perforated plate that conditions the fluid flow by directing the fluid stream through a series of tubes or small apertures.

The reducer 140 is a concentric Venturi reducer having a reduction angle α in a range of 8° to 16°. Some embodiments of the reducer 140 apply a reduction angle of 12°. The reducer 140 may be coupled to the ultrasonic flow meter 100 using a ring type or other flange fitting that provides a smooth inner wall transition from the reducer 140 to the ultrasonic flow meter 100. The upstream flange 106 of the ultrasonic flow meter 100 and the downstream flange 128 of the reducer 140 may align the inner wall surfaces of the reducer 140 and the ultrasonic flow meter 100 to provide a specific alignment of the flange bore to the meter bore. For example, the inner wall surfaces of the reducer 140 and the ultrasonic flow meter 100 may be misaligned by no more than ±0.002 inches in some embodiments. The reducer 140, in combination with the upstream flow conditioner 126, reduces the variation in fluid stream profile factor at the ultrasonic meter 100 during transitional flow to values in a range of approximately 1.18 to 1.8.

To promote a smooth laminar to turbulent flow transition, the inner walls of the reducer 140, and other components of the flow metering system 30 (e.g., the pipes 134, 138, the ultrasonic flow meter 100, etc.) may be finished to reduce surface roughness and friction with the fluid stream. For example, some embodiments of the reducer 140 and/or other components may include inner wall surfaces finished by honing, polishing, or other techniques to provide surface roughness heights ranging from about 16 to 64 micro inches or less (e.g., 16 G to 64 G on the S-22 surface roughness scale).

Figure 6:
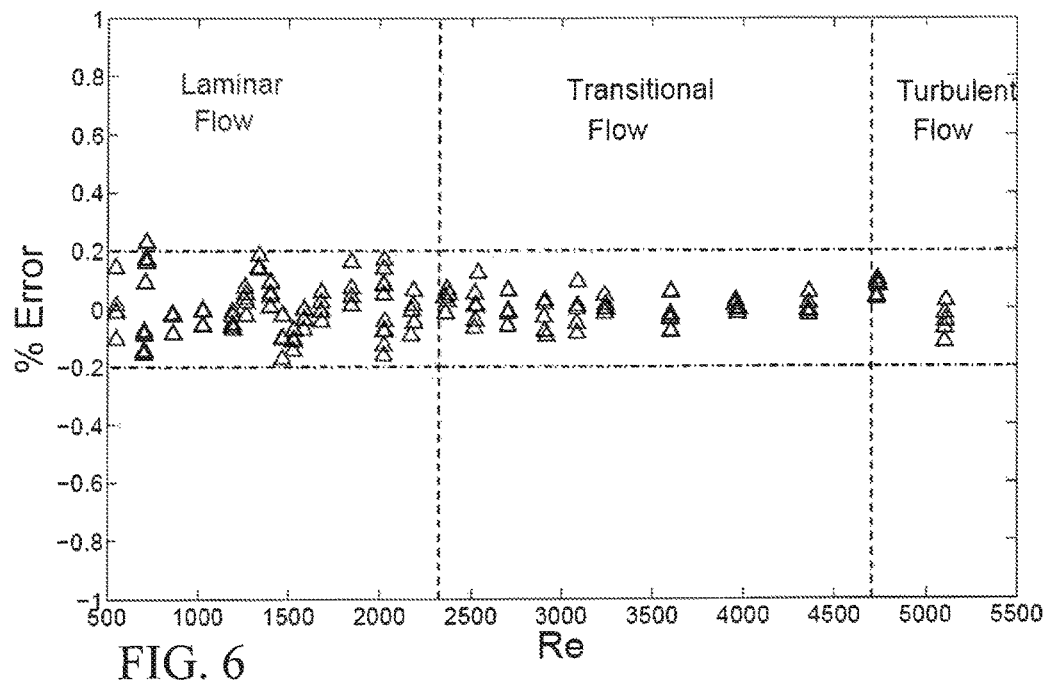
FIG. 6 shows a plot of variation in error of volumetric flow rate measurement versus Reynolds number for an ultrasonic flow metering system in accordance with principles disclosed herein.

The flow conditioner 126 and the downstream reducer 140 combine to extend the linearity of the ultrasonic flow meter 100 to accommodate measurement of fluid flows having Reynolds numbers substantially lower than is possible with conventional ultrasonic measurement systems. FIG. 6 shows a plot of variation in error of volumetric flow rate measurement (with respect to a standard) versus Reynolds number for an embodiment of the ultrasonic flow metering system 30 in accordance with principles disclosed herein. The standard may be provided via a prover, a master meter, etc. As shown in FIG. 6, the flow measurement system 30 can measure volumetric flow of fluids with better than about 0.2% error for fluids having Reynolds numbers as low 500. In contrast, conventional ultrasonic flow measurement systems are error limited to measurement of fluids having Reynolds numbers above about 6000.

The control electronics 124 compute the volumetric flow rate, Q, through the flow meter 100 as a product of the average flow velocity, $v_{avg}$, for the flow meter 100 and the predetermined cross-sectional area of the flow meter 100. The control electronics 124 may apply corrections to the volumetric flow rate, Q, based on the computed instantaneous profile factor, PF, and meter factor, MF, using up to 8th order polynomial curve as shown below in Equation (6).

$$MF = a_0 + a_1 PF + a_2 PF^2 + a_3 PF^3 + a_4 PF^4 + a_5 PF^5 + a_6 PF^6 + a_7 PF^7 + a_8 PF^8 \quad (6)$$

PF is computed as shown in Equation (5). MF is defined as the ratio of reference volume of discharge to the volume discharge by the ultrasonic flow meter 100 within a predetermined time period as:

$$MF = \frac{Q_{ref}}{Q_{LUSM}} \quad (7)$$

where, $Q_{ref}$ is the volume of a standard reference, and, $Q_{LUSM}$ is the volume of the liquid ultrasonic flow meter, and coefficients $a_0$ through $a_8$ are determined at factory calibration via curve fitting (e.g., least squares).

By positioning the reducer 140 downstream of the flow conditioner 126, the velocity of the fluid stream flowing through the flow conditioner 126, and the pressure drop across the flow conditioner 126 are reduced relative to conventional systems. Table 1 below shows that reduction in pressure drop provided by the system 30 varies from 79% to 89% for various pipe diameters.

TABLE 1

Pipe Sizes and Associated Pressure Drop Reduction Percentages

| Pipe 134 inner diameter | Pipe 138 inner diameter | Reducer ratio | Percent reduction in pressure drop with respect to initial pressure drop |
|---|---|---|---|
| 6.0650 | 4.0260 | 0.6638 | 80.6 |
| 10.0200 | 6.0650 | 0.6053 | 86.6 |
| 11.9380 | 7.8910 | 0.6685 | 80.0 |
| 15.0000 | 10.0200 | 0.6680 | 80.1 |
| 18.8140 | 11.9380 | 0.6345 | 83.8 |
| 22.6260 | 13.1250 | 0.5801 | 88.7 |
| 22.6260 | 15.0000 | 0.6630 | 80.7 |
| 25.0000 | 16.8740 | 0.6750 | 79.2 |
| 29.2500 | 18.8140 | 0.6432 | 82.9 |

The flow metering system 30, via the control electronics 124, can measure the Reynolds number and viscosity of the fluid flowing through the system 30. More particularly, the control electronics 124 can measure the Reynolds number and viscosity of the fluid during any of laminar, transitional, and turbulent regimes of the flow. The electronics 124 computes the Reynolds number and viscosity by correlating profile factor and Reynolds number. Some embodiments compute Reynolds number as a polynomial function of profile factor as shown in equation (8):

$$Re = c_0 + c_1 PF + c_2 PF^2 + c_3 PF^3 + c_4 PF^4 + c_5 PF^5 + c_6 PF^6 + c_7 PF^7 + c_8 PF^8, \quad (8)$$

where instantaneous profile factor (PF)) is computed as shown in Equation (5), and coefficients $c_0$ through $c_8$ are determined at factory calibration via curve fitting (e.g., least squares).

Figure 7:
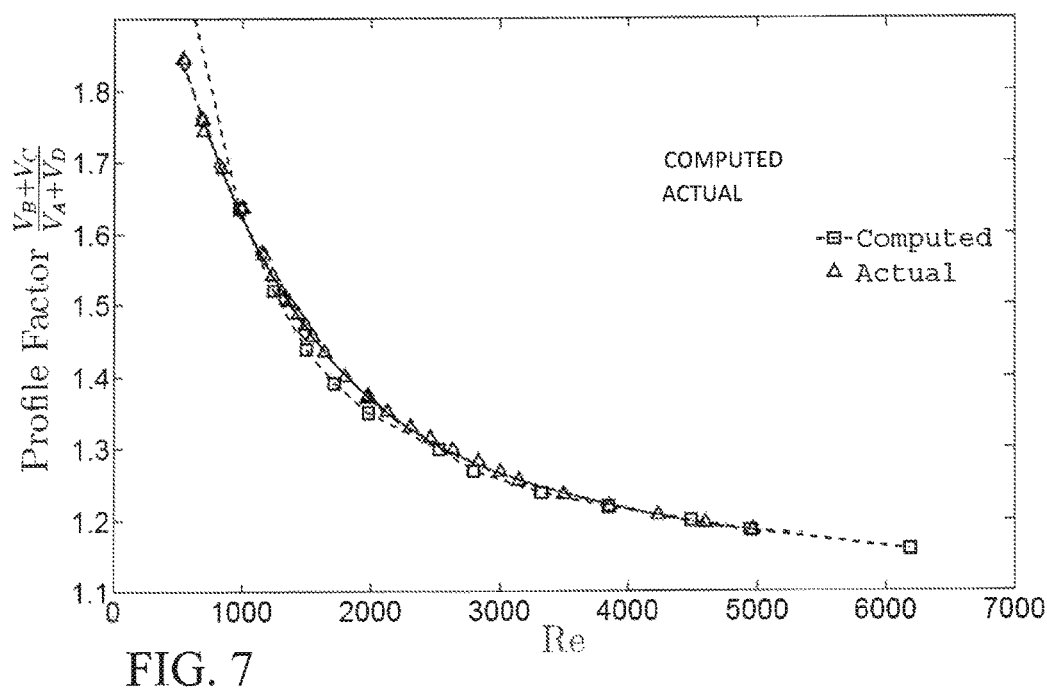
FIG. 7 shows a plot of variation of computed and actual profile factor versus Reynolds number for an ultrasonic flow metering system in accordance with principles disclosed herein.

FIG. 7 shows a plot of variation of profile factor versus Reynolds number for the ultrasonic flow metering system 30 in accordance with principles disclosed herein. More specifically, FIG. 7 shows that embodiments of the ultrasonic flow metering system 30 produce a profile factor ranging from about 1.18 to 1.8 for fluid flows having Reynolds numbers between about 5500 and 500. The electronics 124 can compute Reynolds number for fluids flowing through the system 30 with Reynolds numbers below about 5500, which encompasses laminar, transitional, and pre-turbulent flow regimes.

Figure 8:
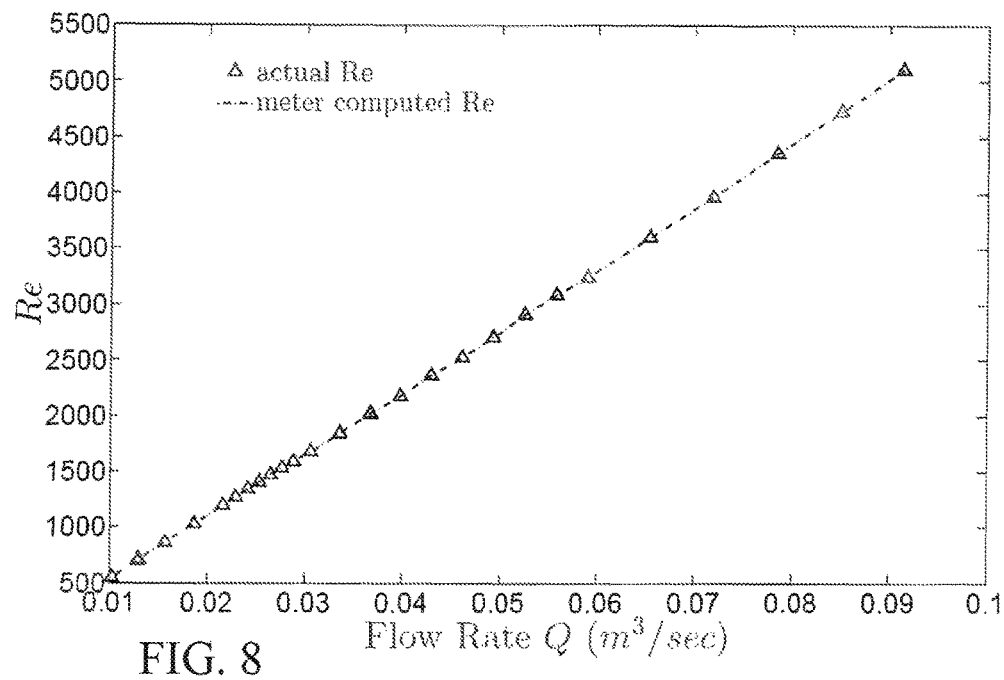
FIG. 8 shows a plot comparing actual Reynolds number of fluid to Reynolds number computed by an ultrasonic flow metering system in accordance with principles disclosed herein.
Figure 9:
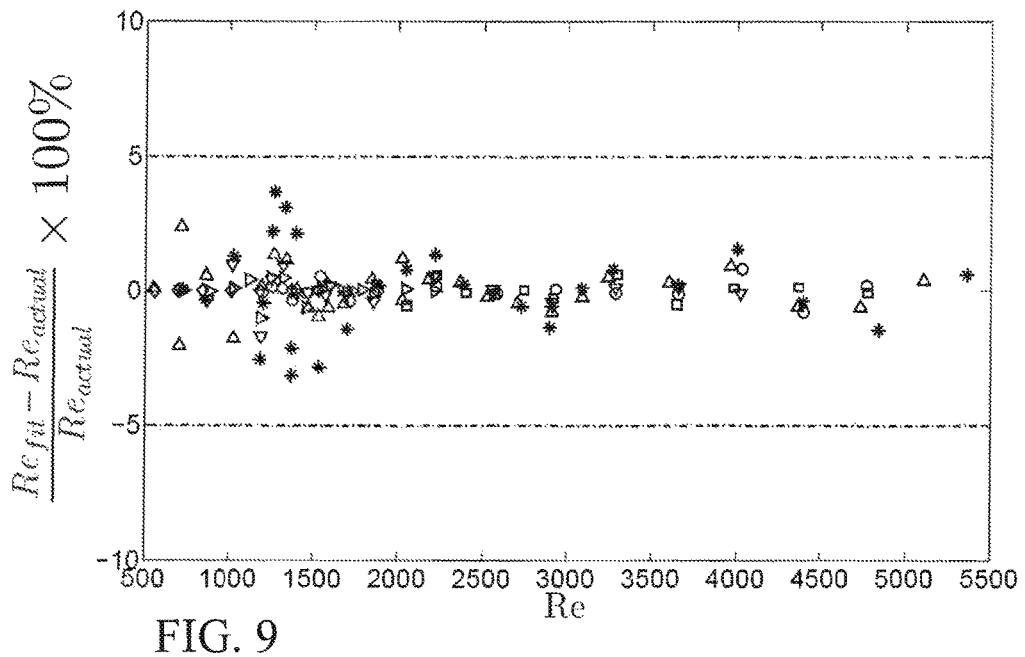
FIG. 9 shows a plot of error in computed Reynolds number versus actual Reynolds number in accordance with principles disclosed herein.

FIG. 8 shows a plot comparing actual Reynolds number of fluid flowing in the system 30 to Reynolds number computed by the electronics 124 for the fluid in accordance with principles disclosed herein. FIG. 8 shows that actual Reynolds numbers and Reynolds numbers computed by the electronics 124 in accordance with equation (8) are very close in value for Reynolds numbers from 500 to 5500. FIG. 9 shows that the error in computed Reynolds number with respect to actual Reynolds number is less than 5% for Reynolds numbers between 500 and 5500.

The electronics 124 computes kinematic viscosity of the fluid based on the computed Reynolds number. The electronics 124 may compute the viscosity as:

$$v = \frac{Ud}{Re} \quad (9)$$

where:
U is the average velocity of the fluid flowing through the system 30 computed by the electronics 124, using, for example, a Gaussian quadrature integration (equation (4));
d is the diameter of the central bore 104; and
Re is the Reynolds number of the fluid flowing through the system 30 computed by the electronics 124 as per equation (8).

Figure 10:
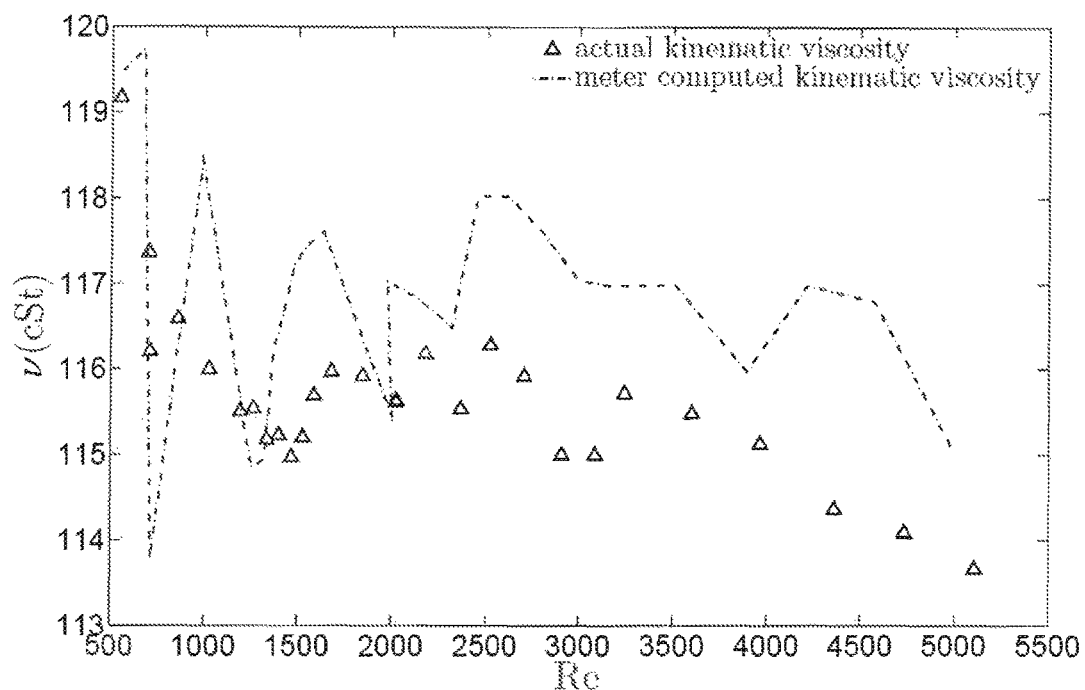
FIG. 10 shows a plot of actual kinematic viscosity of fluid and kinematic viscosity computed by an ultrasonic flow metering system in accordance with principles disclosed herein.
Figure 11:
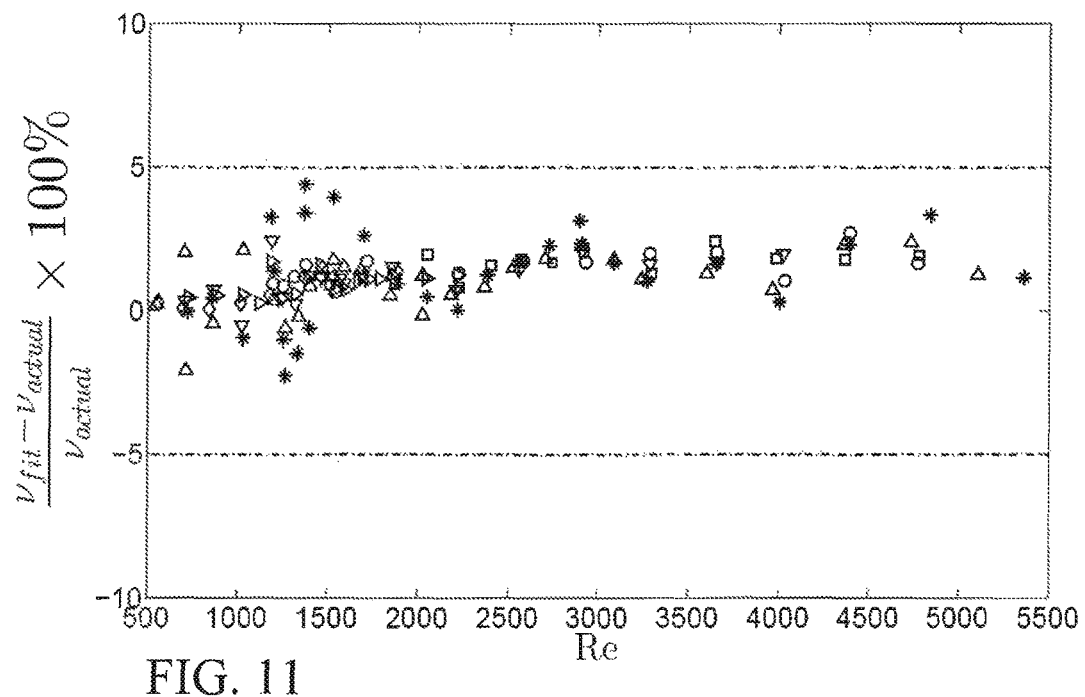
FIG. 11 shows a plot of error in computed kinematic viscosity versus Reynolds number in accordance with principles disclosed herein.

FIG. 10 shows a plot of actual kinematic viscosity of fluid and viscosity computed by the electronics 124 in accordance with equation (9) for Reynolds numbers between 500 and 5500. As shown in FIG. 11, the viscosity values computed by the electronics 124 differ from the actual viscosity by less than 5% for Reynolds numbers between 500 and 5500.

Figure 12:
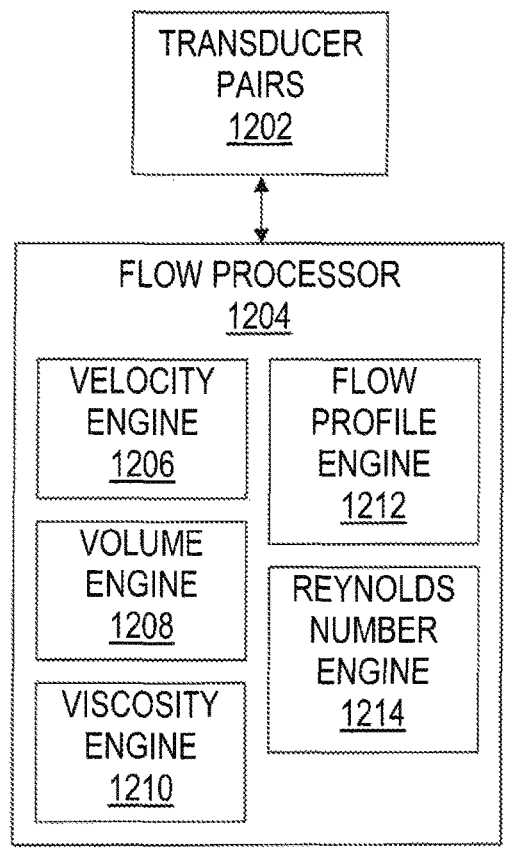
FIG. 12 shows a block diagram of circuitry of an ultrasonic flow meter in accordance with principles disclosed herein.

FIG. 12 shows a block diagram of circuitry of the ultrasonic flow meter 100 in accordance with principles disclosed herein. The circuitry includes transducer pairs 1202 and a flow processor 1204. The transducer pairs 1202 include the paired ultrasonic transducers 108, 110, 112, 114, 116, 118, 120, and 122 as shown in FIG. 5. Some embodiments may include a different number of ultrasonic transducers. The flow processor 1204 may be included in the electronics 124. The flow processor 1204 includes circuitry that computes the various flow parameters, such as velocity, Reynolds number, etc., discussed herein.

The flow processor 1204 includes a velocity engine 1206, a volume engine 1208, a flow profile engine 1212, a Reynolds number engine 1214, and a viscosity engine 1210. The flow processor 1204 may control the timing of ultrasonic signal generation by the transducer pairs 1202, and receive signals from the transducer pairs 1202 indicative of reception of ultrasonic signals exchanged of by a pair of transducers. Based on the propagation timing of the ultrasonic signals exchanged by the transducer pairs 1202, the velocity engine 1206 computes a flow velocity for the fluid flowing through the chord formed by each transducer pair as shown in equation (2), and computes an average flow velocity as per equation (4). Based on the average flow velocity computed by the velocity engine and the predetermined cross sectional area of the central bore 104, the volume engine 1208 computes the volume of fluid flowing through the system 30.

The flow profile engine 1208 computes an instantaneous value of flow profile factor for the fluid stream flowing through the ultrasonic flow meter 100. The flow profile engine 1208 may compute the flow profile factor value by applying the chordal flow velocities computed by the velocity engine 1206 in conjunction with equation (5).

The Reynolds number engine 1214 computes a Reynolds number for the fluid flowing through the system 30 (e.g., in transitional flow regime). The Reynolds number may be computed as a function of instantaneous profile factor determined by the flow profile engine 1212. The Reynolds number engine 1214 may compute the Reynolds number as shown in equation (8). The viscosity engine 1210 computes the kinematic viscosity of the fluid flowing in the system 30 (e.g., in transitional flow regime) based on the Reynolds number provided by the Reynolds number engine 1214, the average flow velocity determined by the velocity engine 1206, and the known diameter of the central bore 104 as shown in equation (9).

The flow parameters computed by the flow processor 1204 may be provided to other systems, and/or communicated to operators of the system 30. Such information, e.g., the computed Reynolds numbers, may provide information regarding possible transition between flow regimes and potential increase in measurement error.

Figure 13:
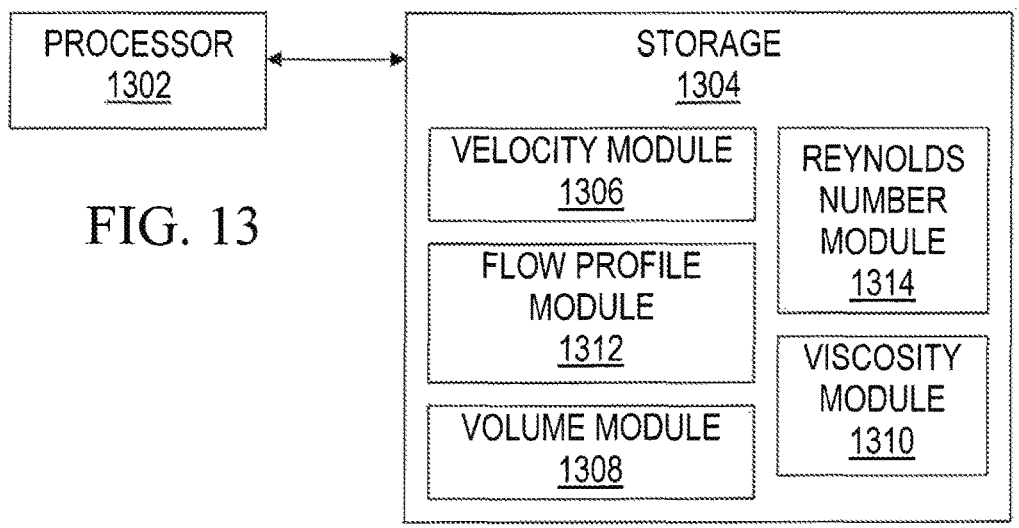
FIG. 13 shows a block diagram for a flow processor of an ultrasonic flow meter in accordance with principles disclosed herein.

FIG. 13 shows a block diagram for the flow processor 1204 of the ultrasonic flow meter 100 in accordance with principles disclosed herein. The flow processor 1204 includes a processor 1302 coupled to storage 1304. The processor 1302 may be, for example, a general-purpose microprocessor, digital signal processor, microcontroller, or other device configured to execute instructions for performing the flow analysis operations disclosed herein. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The storage 1304 stores instructions that the processor 1302 executes to perform the flow parameter computations disclosed herein. The storage 1304 is a non-transitory computer-readable storage device. A computer-readable storage device may include volatile storage such as random access memory, non-volatile storage (e.g., a hard drive, an optical storage device (e.g., CD or DVD), FLASH storage, read-only-memory), or combinations thereof. Processors execute software instructions. Software instructions alone are incapable of performing a function. Therefore, in the present disclosure, any reference to a function performed by software instructions, or to software instructions performing a function is simply a shorthand means for stating that the function is performed by a processor executing the instructions.

The storage 1304 includes a velocity module 1306, a volume module 1308, a viscosity module 1310, a flow profile module 1312, and a Reynolds number module 1314 that include instructions that when executed by the processor 1302 cause the processor 1302 to respectively perform the functions of the velocity engine 1206, the volume engine 1208, the viscosity engine 1210, the flow profile engine 1212, and the Reynolds number engine 1214.

FIG. 14 shows a flow diagram for a method 1400 for measuring viscous liquids using an ultrasonic flow meter 100 in accordance with principles disclosed herein. Though depicted sequentially as a matter of convenience, at least some of the actions shown can be performed in a different order and/or performed in parallel. Additionally, some embodiments may perform only some of the actions shown. In some embodiments, at least some of the operations of the method 1400, as well as other operations described herein, can be implemented as instructions stored in computer readable storage device 1304 and executed by the processor 1302.

In block 1402, the downstream end of a conical reducer 140 is connected to the upstream end of the ultrasonic meter 100. The reducer 140 includes an angle of reduction in a range of 8 degrees to 16 degrees between the upstream and downstream ends of the reducer 140. The flanges coupling the reducer 140 and the ultrasonic flow meter 100 provide a smooth inner wall transition from the reducer 140 to the meter 100. The inner surfaces of the flanges may be machined to provide a specific alignment of the flange bore to the meter bore. For example, in some embodiments, misalignment of the inner walls of the reducer 104 and the meter 100 may be no more than ±0.002 inches. To reduce friction between the inner walls and the fluid stream flowing through the system 30, and promote smooth laminar to turbulent flow transition, the inner walls of the reducer 140 may be polished to provide surface roughness heights in a range of about 16-64 micro-inches.

In block 1404, the upstream end of a conical reducer 140 is connected to the downstream end of a flow conditioner 126. The flow conditioner 126 may be, for example, a tube bundle or a perforated plate. The upstream end of the reducer 140 has a greater diameter than the downstream end of the reducer 140. The upstream end of the flow conditioner 126 may be connected to a pipe section 134 having a diameter equivalent to that of the flow conditioner 126. The upstream end of the pipe section 134 may be connected to an expander 142 that couples the pipe section 134 to a smaller diameter pipe 144 upstream of the expander 142.

In block 1406, a fluid stream is flowing through the flow conditioner 126 to the reducer 140, and from the reducer 140 to the ultrasonic flow meter 100. The flow conditioner 126 and the downstream reducer 104 condition the fluid stream to allow the ultrasonic flow meter 100 to accurately measure the flow of fluids over a range of Reynolds number from about 500 to 5500 with no more than about 0.2% error. Conventional ultrasonic flow metering systems are incapable of accurate flow measurement over such a range. To measure the flow of the fluid stream, the ultrasonic meter 100 determines the velocity of fluid flow at each of a plurality of chords, and computes an average flow velocity across the chords.

In block 1410, the ultrasonic flow meter 100 computes flow volume based on the average flow velocity and the known cross sectional area of the center bore 104 of the ultrasonic flow meter 100. The volumetric flow may be computed using correction based on instantaneous profile factor of the fluid stream and meter factor as shown in equations (6) and (7).

In block 1412, the ultrasonic flow meter 100 computes Reynolds number and kinematic viscosity of the fluid stream flowing through the meter 100. To compute the Reynolds number, the ultrasonic flow meter 100 determines instantaneous profile factor for the fluid stream, and computes the Reynolds number as a polynomial function of the profile factor as shown in equation (8). Coefficients of the polynomial may be determined for each meter 100 at the time of manufacture. The ultrasonic flow meter 100 computes the kinematic viscosity of the fluid stream based on the computed Reynolds number as shown in equation (9).

The above discussion is meant to be illustrative of the principles and various exemplary embodiments of the present invention. Numerous variations and modifications will become apparent to those skilled in the art once the above disclosure is fully appreciated. It is intended that the following claims be interpreted to embrace all such variations and modifications.

What is claimed is:

1. An ultrasonic flow metering system, comprising:
an ultrasonic flow meter comprising a pair of ultrasonic transducers arranged to exchange ultrasonic signals through a fluid stream flowing between the transducers;
a flow conditioner disposed upstream of the ultrasonic flow meter;
a reducer disposed between the flow conditioner and the ultrasonic flow meter to reduce the cross-sectional area of the fluid stream flowing from the flow conditioner to the ultrasonic flow meter; and
computation logic configured to compute Reynolds number and viscosity of the fluid stream during transitional flow based on instantaneous profile factor of the fluid stream.

2. The system of claim 1, wherein the flow conditioner and the reducer condition the fluid stream such that the ultrasonic flow meter measures velocity of the fluid stream with less than 0.2 percent error, wherein the fluid stream has a Reynolds number less than 1000.

3. The system of claim 1, wherein the flow conditioner and the reducer condition the fluid stream such that the ultrasonic flow meter measures velocity of the fluid stream with less than 0.2 percent error and the fluid stream has a Reynolds number of no more than 500.

4. The system of claim 1, further comprising flow computation logic configured to compute volumetric flow through the ultrasonic flow meter using correction based on the instantaneous profile factor of the fluid stream and meter factor; wherein meter factor is a ratio of a reference volume of discharge to a volume discharged by the ultrasonic flow meter within a predetermined time period.

5. The system of claim 1, wherein the reducer is a concentric venturi reducer comprising an angle of reduction in a range of 8 degrees to 16 degrees.

6. The system of claim 1, wherein the flow conditioner and the reducer condition the fluid stream such that the profile factor of the fluid stream varies during transitional flow of the fluid stream in a range of approximately 1.18 to 1.8.

7. The system of claim 1, wherein the flow conditioner and the reducer reduce pressure loss in the system by over 75 percent relative to a flow metering system comprising a flow conditioner having a diameter equivalent to that of the flow meter.

8. The system of claim 1, wherein the computation logic is configured to compute the Reynolds number and viscosity with less than 5 percent error; wherein the fluid stream has a Reynolds number in a range of from 500 to 5500.

9. The system of claim 1, further comprising a connection of the reducer to the ultrasonic flow meter comprising a surface roughness height of not more than 64 micro inches.

10. A method for ultrasonic metering, comprising:
connecting a downstream end of a reducer to an upstream end of an ultrasonic flow meter;
connecting an upstream end of the reducer to a downstream end of a flow conditioner; and
computing Reynolds number and viscosity of the fluid stream during transitional flow based on instantaneous profile factor of the fluid stream;
wherein an inner cross-sectional area of the downstream end of the reducer is smaller than an inner cross-sectional area of the upstream end of the reducer.

11. The method of claim 10, further comprising measuring average velocity of a fluid stream flowing through the ultrasonic flow meter with no more than 0.2 percent error; wherein the fluid stream has a Reynolds number as low as 500.

12. The method of claim 10, further comprising computing volumetric flow through the ultrasonic flow meter using a correction based on the instantaneous profile factor of the fluid stream and meter factor; wherein meter factor is a ratio of a reference volume of discharge to a volume discharged by the ultrasonic flow meter within a predetermined time period.

13. The method of claim 10, wherein the reducer is a concentric venturi reducer comprising an angle of reduction in a range of 8 degrees to 16 degrees.

14. The method of claim 10, further comprising reducing, via the flow conditioner and reducer, pressure drop across the flow conditioner in a range of 79 percent to 89 percent relative to pressure drop in a system comprising a flow conditioner of equivalent diameter to the ultrasonic meter.

15. The method of claim 10, further comprising computing the Reynolds number and viscosity with less than 5 percent error; wherein the fluid stream has a Reynolds number in a range of from 500 to 5500.

16. The method of claim 10, further comprising conditioning the fluid stream, via the flow conditioner and reducer, such that the profile factor varies during transitional flow of the fluid stream in a range of approximately 1.18 to 1.8.

17. An ultrasonic flow metering system, comprising:
a flow conditioner;
a reducer;
an ultrasonic flow meter; and
computation logic;
wherein the flow conditioner is coupled to an upstream end of the reducer, and the ultrasonic flow meter is coupled to a downstream end of the reducer;
wherein the flow conditioner and the reducer condition a fluid stream flowing through the ultrasonic flow meter such that the ultrasonic flow meter measures velocity of the fluid stream with less than 0.2 percent error and with the fluid stream having a Reynolds number less than 5000; and
wherein the computation logic is configured to compute Reynolds number and viscosity of the fluid stream during transitional flow based on instantaneous profile factor of the fluid stream.

18. The system of claim 17, further comprising at least three pipe diameters of straight pipe coupled to an upstream end of the flow conditioner.

19. The system of claim 17, wherein the fluid stream has a Reynolds number as low as 500.

20. The system of claim 17, further comprising flow computation logic configured to compute volume of the fluid stream based on a correction derived from instantaneous profile factor of the fluid stream and meter factor; wherein meter factor is a ratio of a reference volume of discharge to a volume discharged by the ultrasonic flow meter within a predetermined time period.

21. The system of claim 17, wherein the reducer is a concentric venturi reducer comprising an angle of reduction in a range of 8 degrees to 16 degrees.

22. The system of claim 17, wherein the computation logic is configured to compute the Reynolds number and viscosity with less than 5 percent error; wherein the fluid stream has a Reynolds number in a range of from 500 to 5500.

23. The system of claim 17, wherein computation logic is configured to compute the Reynolds number based on an eighth order polynomial function of the instantaneous profile factor of the fluid stream.

* * * * *